Patented June 7, 1932

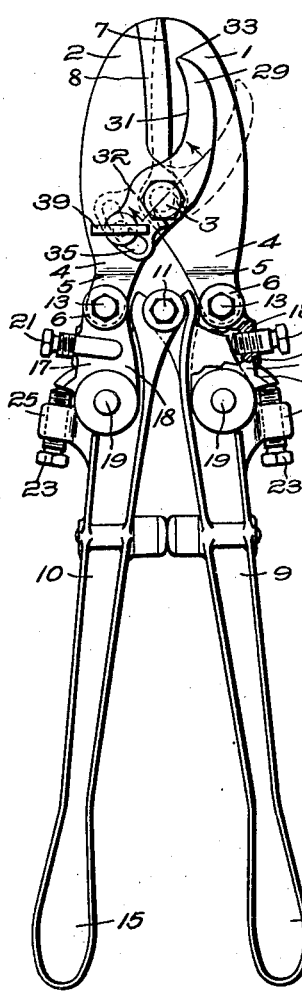

1,862,033

UNITED STATES PATENT OFFICE

HENRY W. PORTER, OF BROOKLINE, MASSACHUSETTS, ASSIGNOR TO H. K. PORTER, INC., OF EVERETT, MASSACHUSETTS, A CORPORATION OF MASSACHUSETTS

CUTTING TOOL

Application filed July 12, 1928. Serial No. 292,089.

This invention aims to provide a light, compact and powerful shearing cutting tool for cutting sheet metal, rods, wire rope and various other materials.

In the accompanying drawing, I have shown merely for illustrative purposes, a cutting tool capable of practising this invention, wherein:

Fig. 1 is a side elevation of the cutting tool, with the keeper shown in full and dotted lines in its two extreme gauging positions, the cutting jaws being shown closed;

Fig. 2 is also a side elevation of the tool showing the cutting jaws in open positions, and portions of the operating levers broken off to save space in the drawing, the keeper being shown in dotted lines in inoperative position;

Fig. 3 is an edge view of the tool;

Fig. 4 is an end view of the cutting jaws and keeper;

Fig. 5 is a diagram, showing the cutting jaws in section just as they are about to engage the work and the keeper in functioning position to prevent tilting of the work as the cutting operation takes place;

Fig. 6 is a detail section taken on line 6—6 of Fig. 1;

Fig. 7 is a diagram showing the arrangement of levers comprising the tool; and

Fig. 8 is a diagram illustrating the manner of plotting the curve of the cutting edges of the jaws.

The particular embodiment of this invention selected for purposes of illustration, and shown in the drawing, comprises cutting jaws 1 and 2, pivoted together by a screw 3. The cutting jaws have operating arms 4, offset at 5 in opposite directions to bring the eyes 6 of said arms into a common plane, arranged centrally with respect to the cutting jaws 1 and 2. Each cutting jaw has a cutting edge 7 and the outer portion of the body of each cutting jaw is herein backed off or bevelled at 8. The jaws 1 and 2 are arranged to swing about the axis of the pivotal stud 3 in different parallel planes, the edges 7 of said jaws overlapping to produce a shearing cut upon the work placed between said jaws. Operating means are provided for the cutting jaws, which desirably consist of operating levers 9 and 10 pivoted together at 11 and also pivoted respectively to the operating arms 5 of the cutting jaws by means of screws 13. The operating levers 9 and 10 are each provided with an operating handle 15 of sufficient length to apply the necessary power through the operating arms 5 of the cutting jaws to the cutting edges.

Interposed between the end of each cutting jaw operating arm and its operating lever is a U-shaped link 17 pivoted at 19 to its operating lever which it straddles and at 13 to its operating arm which said link likewise straddles. This link is utilized to effect adjustment of the cutting jaw in order to vary the relation between each pivot 13 and the pivot 11 of said operating levers so as to maintain the desired relation between the edges of the cutting jaws 1 and 2, but more particularly to counteract wear upon said edges due to resharpening. Adjusting screws 21 and 23 are provided for each of said links and cooperate to adjust their respective link angularly with respect to its operating lever and to maintain said link in its adjusted relation. To this end, the adjusting screw 21 extends through the back or intervening web 16, which ties together the side members 18 of the U-shaped link 17, into engagement with the rear edge of the operating lever lying between the sides of said link, while the screw 23 has screw-threaded engagement with a lateral lug 25 on the operating arm or lever and is movable into contact with a projecting lug 27 on the web 16 of said U-shaped link. By releasing the screw 23 and tightening the screw 21, the axis of the screw 13 will be moved bodily away from the axis of the pivotal screw 11 for said operating levers, and obviously a reverse movement of said screws will move said axis bodily toward the axis of said screw 11. The adjustment of both levers will effect the proper overlapping of the cutting edges of said cutting jaws and this relation may be maintained regardless of the extent of wear upon the cutting edges. The greater the distance between the centers 13, 13, the greater will be the overlap of the cutting edges.

The edges 7 of the cutting jaws 1 and 2 are preferably convexly formed, herein describing curves of which a tangent through any point thereof will describe a predetermined angle, for example $7\frac{1}{2}°$, with the central or mid-plane of the work when that point is coincident with its work plane. This will best be understood by referring to Fig. 8, wherein the line $w$—$w'$ represents the mid-plane of the work for a point $d'$; $c$ the axis of the cutting jaws and $d'$ the inner or first effective cutting point of the cutting jaws. The point $d^5$ is the outermost effective cutting point of said edges or represents the length of the cutting jaws.

In plotting the desired curve for the cutting edge, the length of the effective cutting edge $d'$—$d^5$ is divided into a given number of equal parts, herein four, and designated $d^2$, $d^3$, $d^4$ and $d^5$. Through each of these points arcs are swung from the center $c$.

As both cutting edges are the same, a description of the plotting of the curve for the cutter 2 will be sufficient. This is started by drawing through the point $d'$ at the angle decided upon, a line representing a tangent of the curve ultimately to be plotted,—said line describing an angle of $7\frac{1}{2}°$ to the line $w$—$w'$,—and intersecting the arc swung from the point $d^2$. Through the intersecting point of this angle and the arc $d^2$ is then drawn a line radial to the axis $c$, and as this line represents the mid-plane of the work for $d^2$ it will be identified by characters $w$—$w^2$. From the point of intersection of the plane $w^2$ with the arc $d^2$ another tangent is drawn at the same angle to said plane $w^2$, herein $7\frac{1}{2}°$, and at the point where this line intersects the arc $d^3$ another radial line $w^3$ is drawn from the center $c$ to indicate the mid-work plane from said point $d^3$. From the intersection of the plane $w^3$ with the arc $d^3$, another tangent is drawn at an angle of $7\frac{1}{2}°$ with the plane $w^3$ until it intersects the arc $d^4$, and the work plane $w^4$ is then drawn from $c$ through this intersecting point. Still another tangent at the same angle with its work plane as those preceding is laid off from the intersection $d^4$ and $w^4$ intersecting the arc $d^5$ and representing in the present example the outermost cutting point of the cutting jaw 2. A curve is then plotted through the foregoing intersecting points of the arcs $d^2$, $d^3$, $d^4$ and $d^5$ with their respective planes $w^2$, $w^3$, $w^4$ and $w^5$, which curve accurately describes the curve of the cutting edge.

It will be apparent that the greater the number of points $d$ taken on the line $w$, the more accurate will be the curve plotted through said intersecting points.

For different kinds of work it may be desirable to increase or decrease the aforesaid angle of $7\frac{1}{2}°$, which obviously may be done without departing from the scope of the present invention.

Cutting edges of the foregoing type will have a uniform shearing or cutting action on the work at all stages of the cut, which could not be obtained if the angle of opening or incidence of the edges were not constant throughout the working stroke.

Thus, when the most efficient angle of incidence of the cutting edges has been determined for cutting any class of material, such as sheet metal, cutting edges can be designed that will cut such material in the most efficient way at all stages of the cut.

The herein described convexly formed wide angled cutting edges will also allow the cutting of curves or irregular shapes from sheet metal or other material.

A desirable feature of this invention resides in the fact that a compound leverage of the toggle joint type is provided for operating each cutting jaw while the pivots and connections thereof are so arranged that the force exerted by the cutting edges upon the work will be approximately uniform at different points along the effective cutting range of said jaws and the force applied to the handles of said operating levers regardless of the position of said levers will likewise remain substantially constant. This point will best be understood by referring to the diagram in Fig. 7 wherein ($a$) represents the effective length of the operating lever 10, ($b$) the effective length of the lever from the axis of the pivot 11 to the axis of the pivot 13, ($c$) the effective length of the lever from the axis of the pivot 13 to the axis of the pivot 3 and ($d$) the effective length of the lever from the axis 3 to the first point $d'$ on the cutting edge where force is applied.

Assume, for example, that the range of movement of the left hand operating lever 10 is from $p$ to $p^5$ and that the line $w$—$w'$ represents the central plane of the work. The effective range of the cutting edge 7 is from $d$ to $d^5$, said cutting range being divided into five equal parts which correspond to the five positions $p'$, $p^2$, $p^3$, $p^4$ and $p^5$ indicating the various points at which power will be applied when the points $d'$, $d^2$, $d^3$, $d^4$ and $d^5$ respectively of the cutting edge are acting upon the work.

It will be apparent from the drawing, particularly Fig. 7, as the handle 15 moves from $p$ toward $p^5$, owing to the compound lever arrangement between the operating levers and the cutting jaws, that a constant force applied to the end of lever 15 will increase in efficacy from the points $p$ toward $p^5$ because the positions of the aforesaid levers become increasingly more favorable, while, on the contrary, the force resulting from said power applied at points $p'$, $p^2$, $p^3$, $p^4$ and $p^5$ will proportionately decrease or become unfavorable at points $d'$, $d^2$, $d^3$, $d^4$ and $d^5$ as the distance increases from the point c; and that by reason of the intervening levers ab and cd and the method of transmitting motion through them from P to F, the decrease in force will be compensated by a corresponding increase in power so that F, the force acting upon the work, will remain approximately uniform from $d$ to $d^5$ and P, the power applied at points from $p$ to $p^5$, will remain substantially constant throughout the cutting stroke.

In cutters of the shearing type shown, it is desirable to provide means for preventing tilting of the work from a plane at right angles to the cutting plane to one parallel therewith or with the inner adjacent faces of the cutting jaws when pressure is applied to said jaws. To this end a keeper 29 is provided, said keeper desirably consisting of a finger having a concaved face 31 adjoining the work and a work-engaging point 33 arranged at a distance from the pivot 3 to most advantageously engage with work of different thicknesses and shapes. The keeper 29 is herein pivotally mounted upon the stud 3 against the outer face of one of the cutting jaws, herein the cutting jaw 2, so as to swing with said jaw when the cutting jaws are opened or closed. Desirably this keeper is adjustably secured to said cutting jaw 2 so that the point 33 may be moved to different distances from the cutting edge 7 of said jaw to accommodate varying thicknesses of work, and this adjustment is effected herein by providing an elongated slot 35 in an arm 37 of said keeper, said slot being desirably formed on the arc of a circle the center whereof is coincident with the axis of the pivot 3. A thumb screw 39 extends through said slot 35 into screw-threaded engagement with the cutting jaw 2. By releasing the screw 39, the keeper 29 may be swung about the axis of the pivot 3, the extent of said elongated slot 35, and by the tightening of said screw 39 said keeper may be set at any point between those represented by the ends of said slot 35. The keeper 29 will normally remain either at the position shown in full lines or that shown in dotted lines in Fig. 1 or at some point intermediate these two positions, when cutting transversely of the work.

The curve of the under edge 31 is not limited to that shown but may be varied materially to accommodate work of various shapes. In the present example the shape shown is particularly suitable for flat work, one side of which will be engaged by the point 33 while the opposite edge will adjust itself to the proper point in said curve to permit the work to lie flat against the cutting jaw without tilting.

In cutting wire ropes, rods or wire cables the work is placed in contact with said concave face 31 and will naturally seek the deepest portion of said face, the curve thereof helping to retain the strands of rope or cable from spreading out while being cut.

The present tool is also well adapted for cutting lengthwise through work that is considerably longer than the cutting edges of said jaws, as shown in dotted lines in Fig. 2. At such times the keeper is moved into inoperative position to the left of the cutting edges as shown in dotted lines, so that the severed ends of the work may pass freely beyond the rounded portion 41 of said cutting jaw 2, at which point it will be deflected slightly to clear said rounded portion. To this end the keeper is therefore provided with a slot 43 arranged on an arc concentric with the axial center of the stud 39 when the latter is concentric with the circular end 36 of the slot 35 (see Fig. 2), the radius being herein approximately equal to the distance between the center of the thumb screw 39 and that of the pivot screw 3, extending outwardly from a point nearly midway thereof to its edge, whereby said keeper may be swung about the axis of the set screw 39 toward the left, Fig. 2, in the direction of the arrow $e$, and into its dotted line position. To facilitate the last mentioned action, the screw 3 shown most clearly in Fig. 6 is suitably formed to provide a shoulder 45 and its screw-threaded end 47 engages a correspondingly screw-threaded hole in the other cutting jaw 1 opposite to the shoulder 45. A check nut 49 engages the protruding end of said screw-threaded portion and firmly secures the latter in place in the cutting jaw 1 so that constant movement of said jaws relatively to each other will not disturb the adjustment of said pivot screw, nor will it interfere with the pivotal movements of said keeper about the screw 39.

An annular groove 51 is provided between the shoulder 45 and the head 53 of said screw and the edges forming the slot 43 in said keeper are thinned so as to enter said groove 51, and to rock freely therein when said keeper is adjusted for different thicknesses of the work.

By arranging the keeper, center bolt and thumb screw as described and shown in Fig. 6, said keeper may quickly be moved to any desired operative position or removed to an inoperative position without affecting or disturbing the tension to which the cutting jaws have been clamped and locked together by the shouldered center bolt and check nut.

The invention is not limited to the particular embodiment disclosed.

I claim:

1. A cutting tool comprising, in combination, cutting jaws pivoted together and arranged to move in planes to perform a shearing cutting operation, the cutting edges of said jaws describing curves the tangents of each point therein, when said points are coincident with their respective work planes being disposed at uniform angles to their respective work planes, operating levers pivotally connected together and to said cutting jaws and arranged to exert, upon impression thereon of a constant force, an approximately uniform force to the work at each point in said cutting edges, a keeper pivotally mounted to swing with one of said cutting jaws about the pivotal axis of said jaws, and means adjustably to secure said keeper in fixed relation to the cutting jaw with which it swings.

2. A cutting tool comprising, in combination, cutting jaws pivoted together to swing in parallel planes, said cutting jaws overlapping, operating means for said cutting jaws, a keeper pivotally mounted to swing with and at one side of one of said cutting jaws and arranged to prevent the work from being tilted by the action thereon of the other cutting jaw, and means to maintain said keeper in different angular positions in fixed relation to the cutting edge of the jaw with which said keeper swings, to accommodate varying thicknesses of work.

3. A cutting tool having cutting jaws pivoted together to swing in parallel planes, operating means for said cutting jaws, a keeper pivoted to swing about the axis of the pivot for said cutting jaws with one of said jaws but independently of that jaw and a second pivot for said keeper carried by the jaw with which said keeper swings and about which said keeper is arranged to swing transversely to the pivot of said cutting jaws, whereby said keeper may be moved to an inoperative position relatively to the work.

4. A cutting tool having cutting jaws pivoted together to swing in parallel planes, operating means for said cutting jaws, a keeper pivoted to swing about the axis of the pivot for said cutting jaws with one of said jaws and a second pivot for said keeper eccentric to the first mentioned pivot about which second pivot said keeper is arranged to swing away from the pivot point of said cutting jaws, to allow said keeper to be moved to an inoperative position and means to secure said keeper in said inoperative position.

5. In a cutting tool a pair of cutting jaws pivoted together to swing in different planes, operating means for said cutting jaws including a toggle, a keeper pivoted to swing about the axis of the pivot for said cutting jaws with one of said jaws, said keeper having a concavely curved work-engaging face arranged to engage flat work at two points and to maintain said work against the edge of the cutting jaw with which said keeper swings, and means to secure said concave face in fixed relation to one of said cutting edges.

6. In a cutting tool a pair of cutting jaws pivoted together to swing in different planes, operating means for said cutting jaws, a keeper pivoted to swing about the axis of the pivot for said cutting jaws, said keeper having a concave working face adapted to position work at the deepest part of said concave face against one of the cutting edges, and means to secure the concave face of said keeper at different distances from said one of the cutting edges.

7. In a cutting tool a pair of cutting jaws pivoted to swing about a common axis in parallel planes, a keeper pivoted to swing about said common axis with one of said jaws, a second pivot about which said keeper is arranged to swing transversely to said common axis, and means to secure said keeper in adjusted angular positions relatively to said common axis.

8. A shear comprising a pair of blades pivoted together to move past one another in parallel planes to make a shearing cut, said blades being formed with cutting edges following curved lines which are mutually convex, a variable force exerting means for closing said blades to make a shearing cut; said means operative, upon impression thereon of a constant force, to impress on said blades a closing force which increases at such rate as will, in conjunction with the angle at which said cutting edges are presented to the work, maintain the cutting pressure substantially constant throughout the cutting stroke.

9. A shear comprising a pair of blades pivoted together to move past one another in parallel planes to make a shearing cut, said blades being formed with cutting edges following curved lines which are mutually convex and make constant angles with the work, a variable force exerting means for closing said blades to make a shearing cut; said means operative, upon impression thereon of a constant force, to impress on said blades a closing force which increases at such rate as will, in conjunction with the angle at which said cutting edges are presented to the work, maintain the cutting pressure substantially constant throughout the cutting stroke.

10. A shear comprising a pair of blades pivoted together to move past one another in parallel planes to make a shearing cut, said blades being formed with cutting edges following curved lines which are mutually convex and make constant angles with the work, a variable force exerting means comprising a multiple lever system for closing said blades to make a shearing cut; said means operative, upon impression thereon of a constant force, to impress on said blades a closing force which increases at such rate as will, in conjunction with the angle at which said cutting edges are presented to the work, maintain the cutting pressure substantially constant throughout the cutting stroke.

11. A shears comprising a pair of blades pivoted together to move past one another in parallel planes, said blades being formed with cutting edges following curved lines which are mutually convex and make constant angles with the work, pivotally connected handle members, said blades having extensions pivoted to said handle members at such points adjacent the pivotal connection thereof that upon impression of a constant blade closing force on said handle members said blades will, in conjunction with the angle at which said cutting edges are presented to the work, maintain the cutting pressure substantially constant throughout the cutting stroke.

In testimony whereof, I have signed my name to this specification.

HENRY W. PORTER.